United States Patent
Teraoka et al.

(10) Patent No.: US 6,924,625 B2
(45) Date of Patent: Aug. 2, 2005

(54) BATTERY PACK AND METHOD OF DETECTING BATTERY PACK ABNORMALITIES

(75) Inventors: Hiroki Teraoka, Sumoto (JP); Takamasa Yamazoe, Sumoto (JP); Masatsugu Naka, Sumoto (JP); Atsushi Watanabe, Tsuna-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 44 days.

(21) Appl. No.: 10/803,954

(22) Filed: Mar. 19, 2004

(65) Prior Publication Data

US 2004/0189245 A1 Sep. 30, 2004

(30) Foreign Application Priority Data

Mar. 24, 2003 (JP) ........................................ 2003/081065
Apr. 24, 2003 (JP) ........................................ 2003/120660

(51) Int. Cl.[7] .............................. H02J 7/04; H02J 7/00
(52) U.S. Cl. ...................................... 320/150; 320/107
(58) Field of Search ................................ 320/150, 107, 320/128, 134

(56) References Cited

U.S. PATENT DOCUMENTS 6,075,343 A * 6/2000 Hsu ............................ 320/134
6,498,459 B1 * 12/2002 Okumura et al. ............ 320/128

FOREIGN PATENT DOCUMENTS

GB 2 050 721 A 1/1981
JP 3085539 7/2000
JP 2000-315483 11/2000

* cited by examiner

Primary Examiner—Pia Tibbits
(74) Attorney, Agent, or Firm—Wenderoth, Lind & Ponack, L.L.P.

(57) ABSTRACT

The battery pack is provided with a rechargeable battery that can be charged, and a protection device to protect the rechargeable battery when an abnormality occurs. The protection device is provided with an externally exposed first output terminal connected to the first electrode of the rechargeable battery, an externally exposed second output terminal connected to the second electrode of the rechargeable battery, and an externally exposed third output terminal for signal detection as output terminals, and a contact switching section that can switch contact when a rechargeable battery abnormality is detected. The protection device is formed as a single piece with the output terminals and contact switching section. The contact switching section has one end connected to the second electrode of the rechargeable battery, the other end is connected to allow switching between a contact connected to the second output terminal and a contact connected to the third output terminal. When no abnormality is detected the other end is connected to the contact connected to the second output terminal, and when an abnormality is detected the other end switches to the contact connected to the third output terminal.

15 Claims, 11 Drawing Sheets

BATTERY PACK AND METHOD OF DETECTING BATTERY PACK ABNORMALITIES

BACKGROUND OF THE INVENTION

1. Field of the Invention

This invention relates to a battery pack containing rechargeable batteries, and to a method of detecting battery pack abnormalities.

2. Discussion of the Related Art

Battery pack contains rechargeable batteries (secondary batteries), which can be repeatedly recharged, such as nickel-cadmium batteries, nickel-hydrogen batteries, and lithium-ion batteries. Depending on the environment during operation, excessive current can flow in portable electrical equipment which use battery packs. Since problems such as malfunction can result from excessive current flow, electronic circuits configured with over-current protection sections have been provided inside battery packs to prevent excessive current flow. Meanwhile, in battery packs with no over-current protection section, simpler circuit breaker configurations are provided to cutoff excessive current flow. When a circuit breaker detects excessive current flow, it forces disconnection of the power supply circuit to cut-off current flow (refer to Japanese Non-Examined Patent Publication No. 2000-315483).

However, when current flow is completely cut-off by this type of circuit breaker, transient glitches can be generated, and since electrical equipment operation Is halted, there is concern about problems such as lost data in mid-operation. The present invention was developed to solve these types of problems. Thus it is the first object of the present invention to provide a battery pack, which allows detection of abnormalities with a simple configuration, and to provide a method of detecting battery pack abnormalities.

In addition, since there are many different types of electrical equipment which use battery packs, such as portable electrical equipment, there are also many different types of rechargeable batteries housed in battery packs. In particular, the specified voltage of a rechargeable battery is determined by the electrical equipment to which it connects, and It is necessary to connect a battery pack containing rechargeable batteries suitable for the type of electrical equipment. Consequently, a battery pack provided with a signal terminal, which allows the electrical equipment to determine the type of battery pack connected, has been developed (refer to Japanese Patent No. 3085539).

As mentioned above, some battery packs are configured with an over-current protection section to prevent excessive current flow in portable electrical equipment using the battery pack. However, when this type of protection circuit is made, electronic parts and circuit boards are required for circuit implementation, and there are problems of additional manufacturing process steps and rising costs. Further, since this type of protection circuit must be housed inside the battery pack, there is also the problem battery pack size increase.

The present invention was also developed to solve these types of problems. Thus it is the second object of the present invention to provide a battery pack which allows discrimination of the type of rechargeable batteries contained in the battery pack, and allows inexpensive implementation of the battery protection function using minimal space within the battery pack.

The above and further objects and features of the invention will more fully be apparent from the following detailed description with accompanying drawings.

SUMMARY OF THE INVENTION

To achieve the above stated objects, a battery pack for the present invention is provided with a rechargeable battery which can be charged and has a first and second electrode, and a protection device which protects the rechargeable battery when an abnormality is detected. The protection device is provided with a first output terminal which is exposed externally and connects to the first electrode of the rechargeable battery, a second output terminal which is exposed externally and connects to the second electrode of the rechargeable battery, a third output terminal which is exposed externally to detect signals, and a contact switching section which can switch contact to protect the rechargeable battery when an abnormality is detected. The protection device has its output terminals and contact switching section configured as a single unit. The contact switching section connects at one end to the second electrode of the rechargeable battery, and at the other end connects in a manner allowing it to switch between a contact connected to the second output terminal and a contact connected to the third output terminal. The contact switching section is configured to connect the second electrode of the rechargeable battery to the contact connected to the second output terminal during normal operation, and to the contact connected to the third output terminal when an abnormality is detected.

Another battery pack of the present invention has its third output terminal connected to a detection device which identifies the type of the rechargeable battery. The third output terminal otherwise connects to a detection device which discerns rechargeable battery temperature rise.

Another battery pack of the present invention connects the detection device between the third output terminal and the second output terminal.

In another battery pack of the present invention, a safety component is housed in the protection device to protect the rechargeable battery when an abnormality is detected. The safety component is provided with a protection element connected between the second electrode of the rechargeable battery and the second output terminal. This protection element can be a PTC device.

In another battery pack of the present invention, the safety component and the detection device are connected at the surface on the opposite side of the externally exposed output terminals. In addition the detection device can also be electrically connected directly between the second and third output terminals on the opposite side of the surface of the externally exposed output terminals.

In another battery pack of the present invention, the rechargeable battery and the protection device are molded with resin to form a single unit.

In still another battery pack of the present invention, the contact switching section is provided with an arm activated by bimetal. One end of the arm is fixed at node C, which connects to the second electrode of the rechargeable battery, and the other end acts as the switching end. The switching end can connect to contact A connected to the second output terminal to put the arm in parallel with the protection element in the normal operating position, and can connect to contact B connected to the third output terminal to connect the third output terminal and the second electrode of the rechargeable battery in the abnormal operating position.

When the arm activated by bimetal detects an abnormality by sensing temperature rise, it switches from the normal operating position to the abnormal operating position. When the arm no longer senses an abnormality, it is configured to return to the normal operating position.

The method of detecting battery pack abnormalities of the present invention is a method of detecting abnormalities for a battery pack provided with a rechargeable battery which can be charged and has a first and second electrode, and a protection device which protects the rechargeable battery when an abnormality occurs. This method has a step for electrical equipment connected with the battery pack to detect a response signal from the detection device, which distinguishes rechargeable battery type, via the third output terminal, which is connected to the detection device, when the protection device detects no rechargeable battery abnormality. This method also has a step to bypass the detection device and connect the second electrode of the rechargeable battery to the third output terminal when the protection device detects a rechargeable battery abnormality. Further, this method has a step for the electrical equipment to detect abnormalities via the third output terminal and transition to a prescribed abnormal operation mode, which allows operation at a rechargeable battery voltage lower than its specified voltage. In addition, the prescribed abnormal operation mode can include display of a specified display screen.

The battery pack and method of detecting battery pack abnormalities described above achieves the excellent characteristic that abnormalities can effectively be detected with a simple configuration. This is because the battery pack and method of detecting battery pack abnormalities of the present invention has a detection device which serves both to distinguish the type of the rechargeable battery and to detect abnormalities. With this structure, the electrical equipment connected with the battery pack can reliably monitor and detect battery type and abnormalities via the signal terminal.

With the battery pack described above, discrimination of the internal rechargeable battery type is possible by external electrical equipment, and a battery pack with battery protection can be realized inexpensively in a compact configuration. In particular, this is because the battery pack is provided with a signal terminal in a terminal section which houses the protection device, and this signal terminal is connected to a detection device, which identifies the rechargeable battery type. Accordingly, a plurality of different types of battery packs can be accurately distinguished by the electrical equipment allowing optimal use according to the type of battery pack attached. Further, the detection device can serve both to distinguish rechargeable battery type and to detect battery abnormalities, which simplify the structure, miniaturize the terminal section, and contributes to making the overall battery pack lighter and more compact.

DETAILED DESCRIPTION OF THE PREFERRED EMBODIMENTS

Forms of embodiment of the present invention are described below based on the figures. However, the following forms of embodiment are intended as concrete examples of technical concepts for the present invention, and the battery pack and method of detecting abnormalities of the present invention is not limited to the following. Further, to make this detailed description and the claims easy to understand, part numbers assigned to parts of the embodiments are indicated in the claims. However, parts indicated in the claims are in no way limited to the parts represented in the forms of embodiment. Parts shown in the figures may have features such as size and relative position exaggerated to make the description clear. Further, a plurality of structural elements of the present invention may be configured as a single part which serves the purpose of a plurality of elements.

Figure 1:
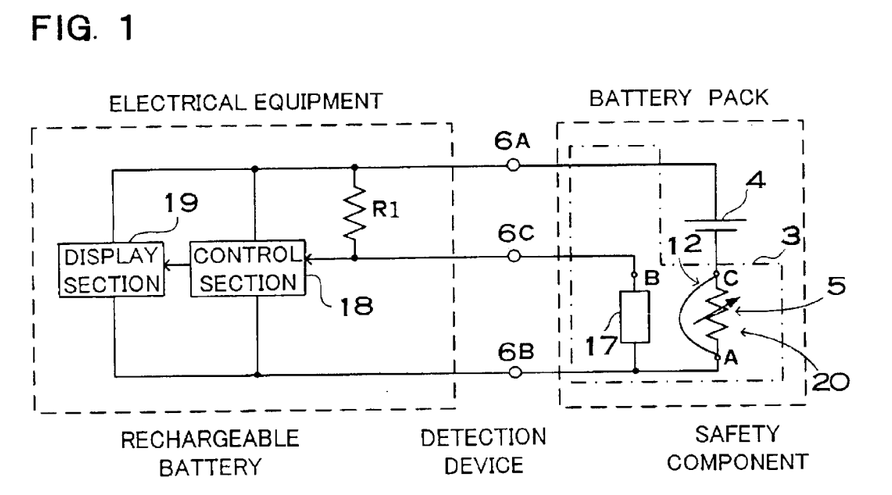
FIG. 1 is a circuit diagram for normal operation of a battery pack associated with a form of embodiment of the present invention.
Figure 2:
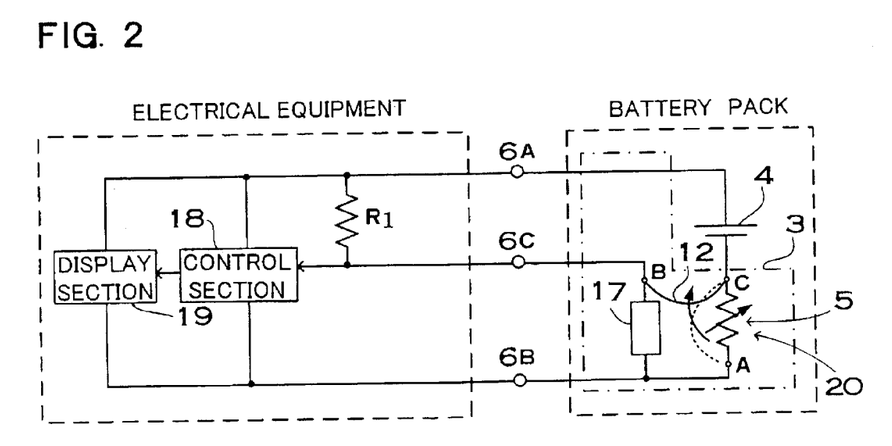
FIG. 2 is a circuit diagram when abnormalities are detected in a battery pack associated with a form of embodiment of the present invention.
Figure 3:
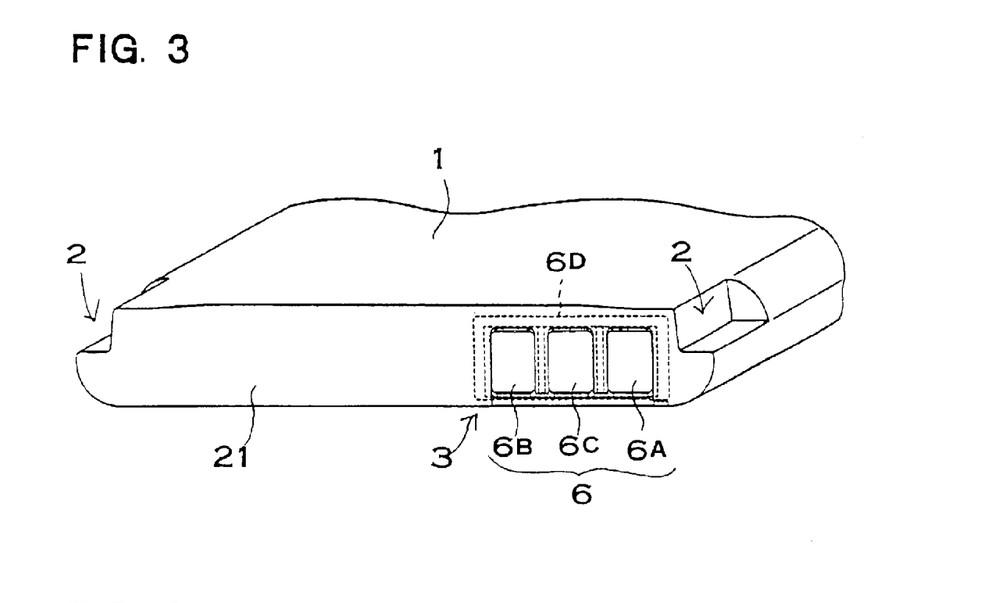
FIG. 3 is an enlarged oblique view showing the output terminal section of a battery pack associated with a form of embodiment of the present invention.
Figure 4:
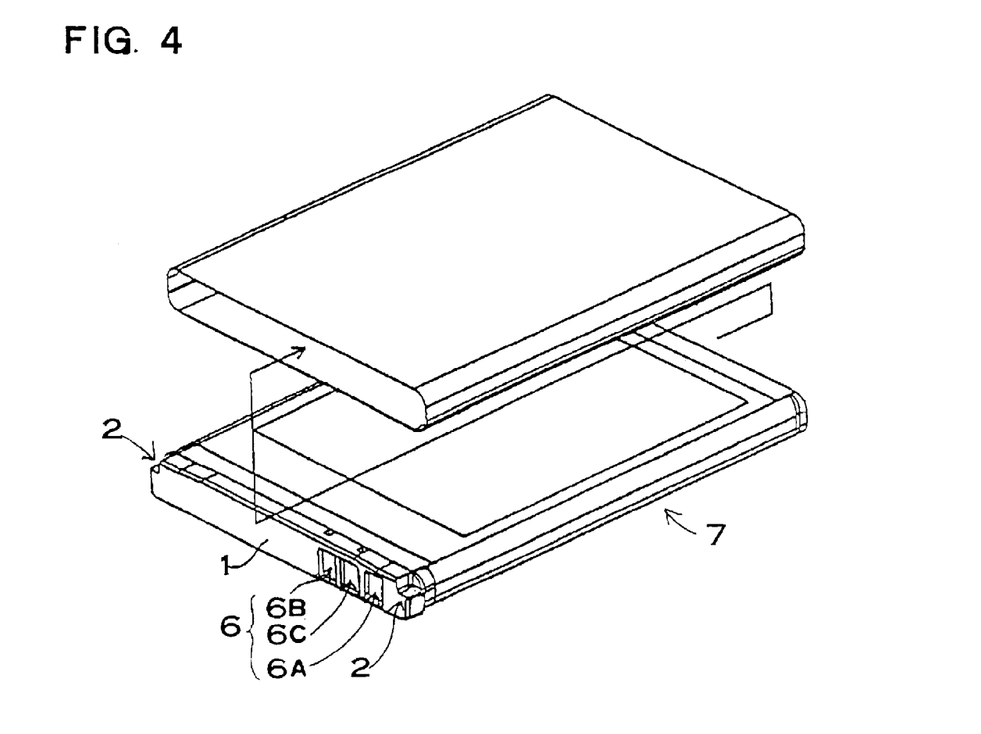
FIG. 4 is an exploded oblique view showing the entire battery pack of FIG. 3.

FIGS. 1 and 2 are circuit diagrams of a battery pack associated with one form of embodiment of the present Invention, and FIGS. 3 and 4 are oblique views of the battery pack. The battery pack shown in these figures is provided with a rechargeable battery 4 and a protection device 3 to prevent events such as abnormal rechargeable battery 4 discharge. The protection device 3 is provided with a protection element 5, a contact switching section 12, and a detection device 17. The protection device 3 is also provided with a first output terminal 6A, a second output terminal 6B, and a third output terminal 6C. As shown in FIGS. 3 and 4, the three output terminals 6 are disposed in a line with electrode surfaces exposed externally. Although in the figures these output terminals are arranged in a straight line from left to right in the order second output terminal 6B, third output terminal 6C, and first output terminal 6A, it should be clear they are not limited to this arrangement. Disposition of each output terminal can be swapped, and optimal vertical, horizontal, skewed, triangular, or other terminal arrangements can be adopted. The positive electrode of the rechargeable battery 4 is connected to the first output terminal 6A. One end of the protection element 5 and one end of the contact switching section 12 are connected to the negative electrode of the rechargeable battery 4. The other end of the protection element 5 is connected to one end of the detection device 17 and the second output terminal 6B. The other end of the detection device 17 is connected to the third output terminal 6C.

The third output terminal 6C connects with the detection device 17 and identifies the type of the rechargeable battery 4. Further, the third output terminal 6C can also connect to a temperature sensor, such as a thermistor, in addition to, or in place of the detection device 17, to detect rechargeable battery 4 temperature.

The contact switching section 12 is configured with one end always fixed, and with the other switching end allowing switching when an abnormality is detected. In the examples of FIGS. 1 and 2, the fixed end of the contact switching section 12 (node C in FIG. 1) is connected between the negative electrode of the rechargeable battery 4 and the protection element 5.

Meanwhile, the switching end can switch between either the other end of the protection element 5, node A in FIG. 1, or between the detection device 17 and the third output terminal 6C, node B in FIG. 2. This contact switching section 12 switches its switching end to contact node A, which is the normal operating position, when there are no abnormalities or operation is normal, and switches its switching end to contact node B, which is the abnormal position, when an abnormality is detected. As a result, during normal operation, the circuit of FIG. 1 can be drawn as the equivalent circuit of FIG. 5, and during abnormality, the circuit of FIG. 2 can be drawn as the equivalent circuit of FIG. 6.

When there are no abnormalities or operation is normal, the protection element 5 is short circuited because the contact switching section 12 connects nodes C and A, and the protection element 5 conducts negligible current. Consequently, as shown in the equivalent circuit of FIG. 5, the first output terminal 6A and the second output terminal 6B are connected to the positive and negative electrodes respectively of the rechargeable battery 4, and electrical power is supplied from the rechargeable battery 4 to electrical equipment connected with the battery pack. In addition, the third output terminal 6C is connected to the negative electrode of the rechargeable battery 4 via the detection device 17. Therefore, a prescribed voltage appears at the third output terminal 6C. Since a voltage dividing resistor R1 is connected in the electrical equipment between the first output terminal 6A and the third output terminal 6C, as shown in FIG. 1, a voltage value is detected at the third output terminal 6C which is the voltage at the rechargeable battery 4 terminals voltage divided by R1 and the detection device 17.

In this configuration, the detection device 17 is used not only to identify the battery pack, but also to detect abnormal operation. During abnormal operation, the switching end of the contact switching section 12 switches from node A to node B. Consequently, node C and node B become connected, and the circuit configuration changes from the equivalent circuit of FIG. 5 to that of FIG. 6. In this configuration, since the third output terminal 6C is connected to the negative electrode of the rechargeable battery 4, which is the reference voltage, no voltage appears at that terminal. As a result, the electrical equipment can detect battery pack abnormality by detecting voltage at the third output terminal 6C, which drops from the voltage divider value established by R1 and detection device 17, to zero. In addition, since the second output terminal 6B is connected to the negative electrode of the rechargeable battery 4 via the protection element 5, current flow is reduced.

Figure 5:
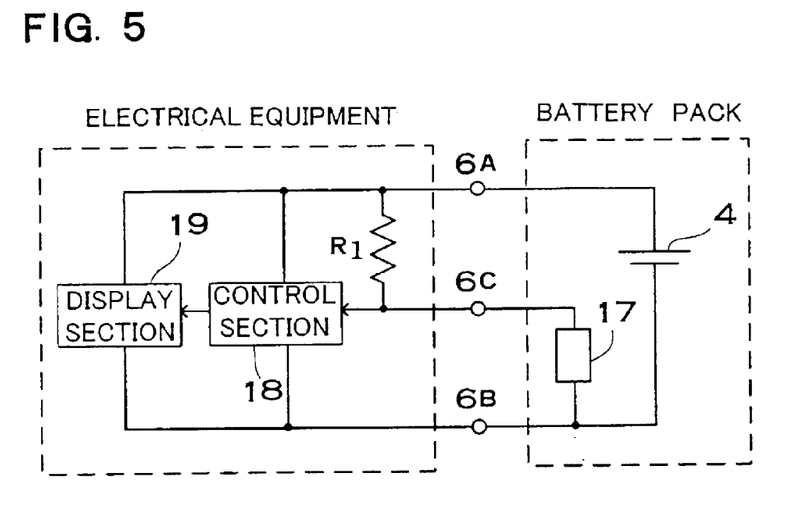
FIG. 5 is an equivalent circuit diagram showing the battery pack and electrical equipment of FIG. 1.
Figure 6:
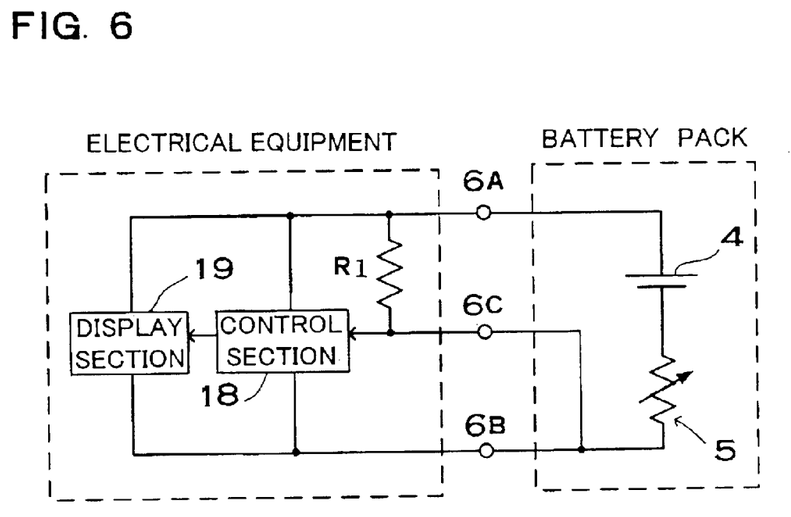
FIG. 6 is an equivalent circuit diagram showing the battery pack and electrical equipment of FIG. 2.

The electrical equipment can transition to a prescribed abnormal operating mode at this time. In the example of the circuit configuration of electrical equipment connected with the battery pack shown in FIGS. 5 and 6, the electrical equipment is provided with a control section 18 which monitors the third output terminal 6C, and a display section 19 controlled by the control section 18. The control section 18 and the display section 19 receive electrical power from the rechargeable battery 4 via the first output terminal 6A and the second output terminal 6B. As shown in FIG. 5, when the voltage at the third output terminal 6C is the value established by the voltage divider of R1 and the detection device 17, the control section 18 judges the situation as normal. On the other hand, when third output terminal 6C voltage drops to zero as shown in FIG. 6, the control section 18 judges battery pack conditions as abnormal, and issues instructions to transition to a specified abnormal mode of operation. As abnormal mode operations, actions are taken such as warning the user that a battery pack abnormality has occurred, protecting or saving data in mid-operation, switching to a low power operating mode, or switching to a spare battery, For example, for the case where the electrical equipment is a portable telephone (cell-phone), when the control section 18 detects abnormality, a message describing abnormal occurrence or a standby screen is displayed by the display section while operations are suspended and data is temporarily saved. The control section 18 can be configured as a gate array integrated circuit such as an FPGA or ASIC. A liquid crystal display or light emitting diode (LED) display can be used as the display section 19.

Power for abnormal mode operation is supplied from the rechargeable battery 4 via the protection element 5. Since the amount of current supplied through the protection element 5 is limited, abnormal mode operations are those which can be executed with lower power than normal. In the case where the electrical equipment has an alternate source of power, it may use the alternate power source instead of, or in addition to the rechargeable battery 4. For example, electrical equipment can use an alternate power source such as an internally housed back-up battery, or a capacitor which is charged by the battery pack during normal operation and discharged during abnormal operation.

The protection element 5 is a resistor or high temperature, high current protection element. Specifically, a component which detects temperature rise or current increase and limits current such as a PTC device can be used as the protection element 5. A PTC (positive temperature coefficient) device is a composite material with positive slope resistance-temperature characteristics. A PTC device has the characteristic that resistance increases with temperature and effectively blocks current flow when temperature rise is detected.

The contact switching section 12 also detects temperature rise and current increase. As described above, when abnormality is detected, the switching end switches to change electrical connection. When abnormality is not detected, the contact switching section 12 is connected in parallel with the protection element 5, and when abnormality is detected, the contact switching section 12 is configured to connect the negative electrode of the rechargeable battery 4 and the third output terminal 6C. Bimetal can be used for this type of contact switching section 12. Bimetal is made up of two types of thin metal plates with different coefficients of expansion which are adhered together. When temperature changes, curvature of both metal plates changes according to the difference in expansion coefficients, and the bimetal plate becomes curved. For example, a combination of invar (64% Fe,: 36% Ni) and bronze (Cu, Sn) is often used as bimetal, and a third metal with an intermediate coefficient of expansion can also be sandwiched between the two metals to smooth the change in curvature.

Figure 7:
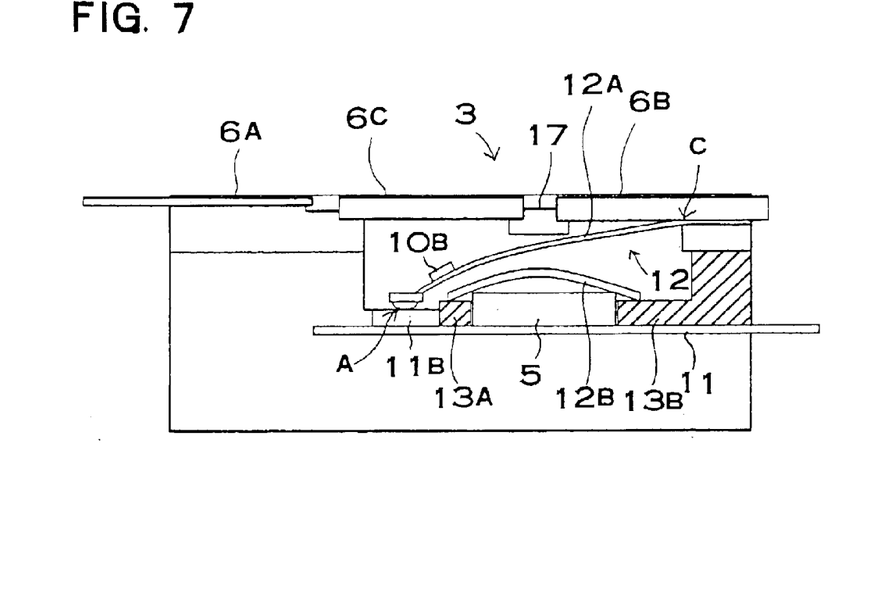
FIG. 7 is a cross-section view showing an example of the configuration of a contact switching section during normal operation.
Figure 8:
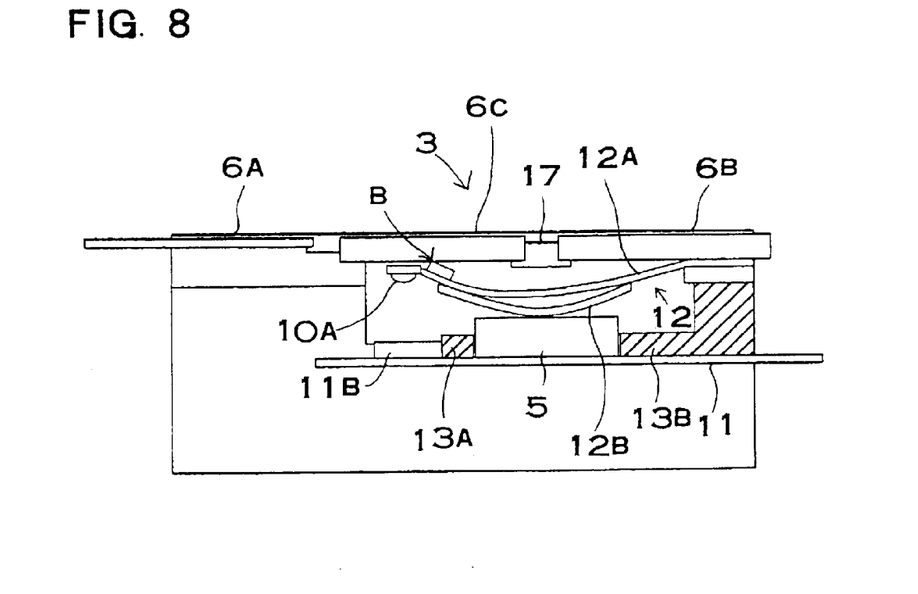
FIG. 8 is a cross-section view showing an example of the configuration of a contact switching section when abnormalities are detected.

An example of a contact switching section 12 configuration using bimetal is shown in FIGS. 7 and 8. These figures are cross-section views showing exposed regions of the first output terminal 6A, the third output terminal 6C, and the second output terminal 6B at the upper surface of the battery pack. FIG. 7 shows the contact switching section 12 prior to activation when no abnormality is detected, and FIG. 8 shows an example of a contact switching section 12 activated due to detection of an abnormality. The contact switching section 12 is provided with an arm 12A activated by bimetal, and this arm 12A is activated either directly or indirectly by bimetal. The contact switching section 12 of FIGS. 7 and 8 is provided with an arm 12A and a pressure plate 12B. The arm 12A is a flexible plate of conductive material, and preferably a copper alloy can be used. The metal plate arm 12A is configured to curve downward in its normal state. The pressure plate 12B is made of bimetal, is disposed at the bottom surface of the arm 12A, and pushes upward on the arm 12A. The pressure plate 12B normally has a convex shape as shown in FIG. 7, but its ends spring upward into a concave shape during detection of an abnormality and pushes the arm 12A against the upper surface as shown in FIG. 8.

In these figures, the first output terminal 6A is made of nickel sheet and connected to the positive electrode of the rechargeable battery 4. The detection device 17 is connected between the third output terminal 6C and the second output terminal 6B, which are similarly made of nickel sheet. A base plate 11 made of copper alloy sheet and disposed below the output terminals is connected to the negative electrode of the rechargeable battery 4. A silver alloy base plate contact 11B and a PTC device, which is the protection element 5, are connected to the upper surface of the base plate 11. The upper and lower surfaces of this PTC device form its contacts. Further, insulating material 13A, 13B is disposed on the left and right of the PTC device. As shown in FIG. 7, the bimetal pressure plate 12B, which rides on the upper surface of the PTC device, is supported by the insulating material 13A, 13B and is insulated from other materials. A copper alloy plate arm 12A is provided with a movable contact 10A projecting downward from the switching end of the arm 12A, and a movable contact 10B on the back of the arm 12A slightly aft of the switching end. These contacts are both made opening surface silver. The contact switching section 12 can be assembled as a single unit with the output terminal section 6D.

The contact switching section 12 operates as follows.

(1) During normal operation, namely in the range of temperature that is not abnormal, the arm 12A flexibly presses against the bottom surface as shown in FIG. 7. In this state, the aft end of the arm 12A, which is the fixed end at point C, is connected to the second output terminal 6B, the front end of the arm 12A, which is the switching end, has the movable contact 10A in contact with the base plate contact 11B, which is point A connected to the base plate 11. Since the base plate 11 is connected to the negative electrode of the rechargeable battery 4, points A and C are connected in this state, and the second output terminal 6B connects directly with the negative electrode of the rechargeable battery 4 without conduction through the PTC device. Since the pressure plate 12B riding on the upper surface of the PTC device does not electrically contact anything else, it does not conduct. Meanwhile, the third output terminal 6C is connected to the second output terminal 6B via the detection device 17. As a result connections are made as shown in the equivalent circuit of FIG. 5, electrical power is supplied to the electrical equipment from the rechargeable battery 4 of the battery pack, and the third output terminal 6C is connected to the detection device 17.

(2) When internal battery temperature rises abnormally, the bimetal pressure plate 12B curves, its ends spring upward as shown in FIG. 8, and it flexibly presses the arm 12A against the upper surface. Point A becomes disconnected, and the movable contact 10B contacts the third output terminal 6C at point B. At the same time, the upper surface of the PTC device is connected to the second output terminal 6B via the pressure plate 12B and the arm 12A. In this configuration, the detection device 17 is bypassed by upper surface connections of the arm 12A, and the third output terminal 6C is directly connected to the second output terminal 6B. In addition, the second output terminal 6B is connected via the PTC device to the negative electrode of the rechargeable battery 4 by the bottom surface of the arm. In this configuration, limited current is supplied to the electrical equipment via the PTC device, and the electrical equipment control section 18 detects abnormality and transitions to abnormal mode operation.

(3) When temperature rise is suppressed and temperature drops within the normal range as a result of current limiting by the PTC device, the bimetal pressure plate 12B returns to the configuration of FIG. 7, the arm 12A is freed from applied pressure and again flexibly presses against the lower surface, and the normal configuration is restored. By repetition of the above operations, the battery pack appropriately supplies electrical power to the electrical equipment while avoiding abnormal conditions.

In this example, the protection element 5 and the contact switching section 12, which detect temperature rise, are assembled in combination, and during abnormal conditions the contact switching section 12 switches connections while the high temperature, high current protection device limits current. Consequently, the temperature for bimetal and PTC activation is made approximately equal.

The contact switching section 12 is not limited to the structure described above. For example, the arm 12A can be made of bimetal without using a pressure plate 12B, and the arm itself can be configured to bend.

In the example described above, the contact switching section 12 is configured as a single structure with the output terminal section 6D. In the battery pack shown in FIGS. 3 and 4, the molded resin region 21 becomes the external case 1. At the assembly step to form the molded resin region 21 of this battery pack, the unassembled battery 7, which is the rechargeable battery 4, is joined with the output terminal section 6D to form a battery pack core, which is fixed in the molded resin region 21 by insertion molding. A battery pack with an external case formed as a plastic case is assembled by joining the protection device 3 and battery 7 as a battery pack core and Inserting the core in the external case. Battery pack assembly is not limited to this example, and a separately molded plastic external case can also be loaded with a battery pack core, made from an output terminal section joined to a battery. Further, the contact switching section can be configured separately from the output terminal section and combined for assembly.

In the example described above, voltage is detected at the third output terminal 6C to judge normal or abnormal conditions, but the system may also be configured to detect current instead of voltage. Further, the first output terminal was the positive electrode and the second output terminal was the negative electrode in the example described above, but the positive and negative electrodes may be swapped for a circuit configuration with the first output terminal as the positive electrode and the second output terminal as the negative electrode to obtain the same result.

Since the detection device 17 of the above configuration serves both to identify the type of the rechargeable battery and to detect abnormality, the number of components is reduced and an inexpensive configuration is possible. The contact switching section is also implemented with a simple structure using bimetal to switch contact. In this manner, required cost is reduced in the form of embodiment described above by implementing abnormality detection and over-current protection with a simple structure, and without using a complex over-current protection section made up of a plurality of electronic circuits. Furthermore, when an abnormality occurs, current is not completely cut-off as with a circuit breaker, partial current is sustained allowing abnormal mode operation, occurrence of the abnormality is immediately transmitted to the electrical equipment, and data loss due to instant power cut-off is avoided. In addition, recovery is achieved by automatic return to normal operation when the abnormal conditions cease to exist.

The battery pack shown in FIGS. 3 and 4 is provided with alignment cut-outs 2 in the corner regions of the external case 1 to attach the battery pack solidly in position in the electrical equipment battery mounting section (not illustrated). In the example of the figures, alignment cut-outs 2 are provided at both sides of the front surface of the external case, which holds the output terminals 6. Since a battery pack with alignment cut-outs 2 can mate in a fixed position on the electrical equipment battery mounting section, it can mount solidly on the electrical equipment without moving in position. However, the battery pack associated with a form of embodiment of the present invention does not necessarily have to provide alignment cut-outs in its external case. This is because the battery pack can mate with the electrical equipment battery mounting section to hold it in a fixed position.

Figure 9:
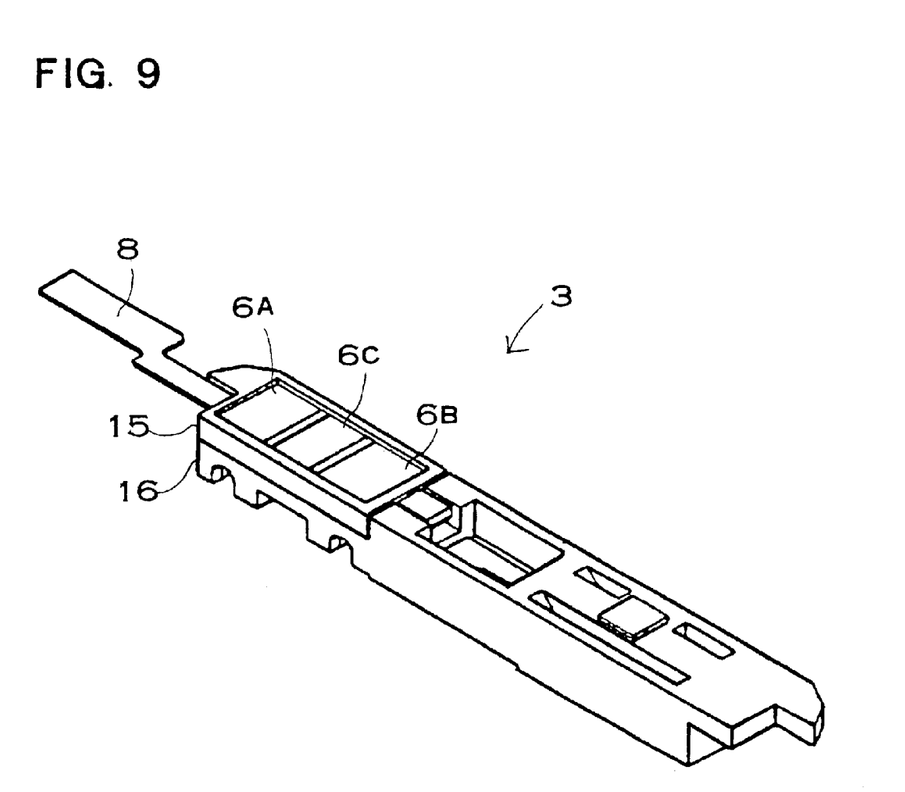
FIG. 9 is an oblique view showing a terminal section for a battery pack associated with a form of embodiment of the present invention.
Figure 10:
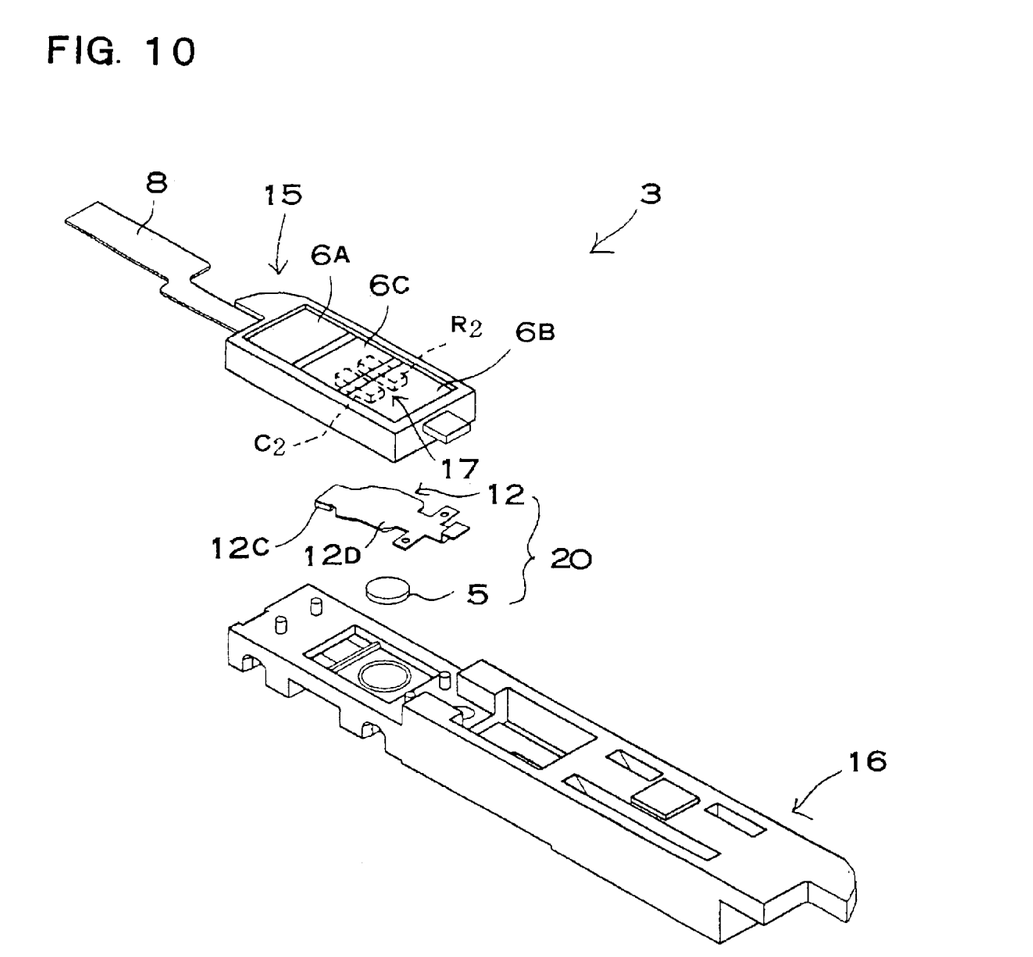
FIG. 10 is an exploded oblique view showing the terminal section for a battery pack of FIG. 9.
Figure 11:
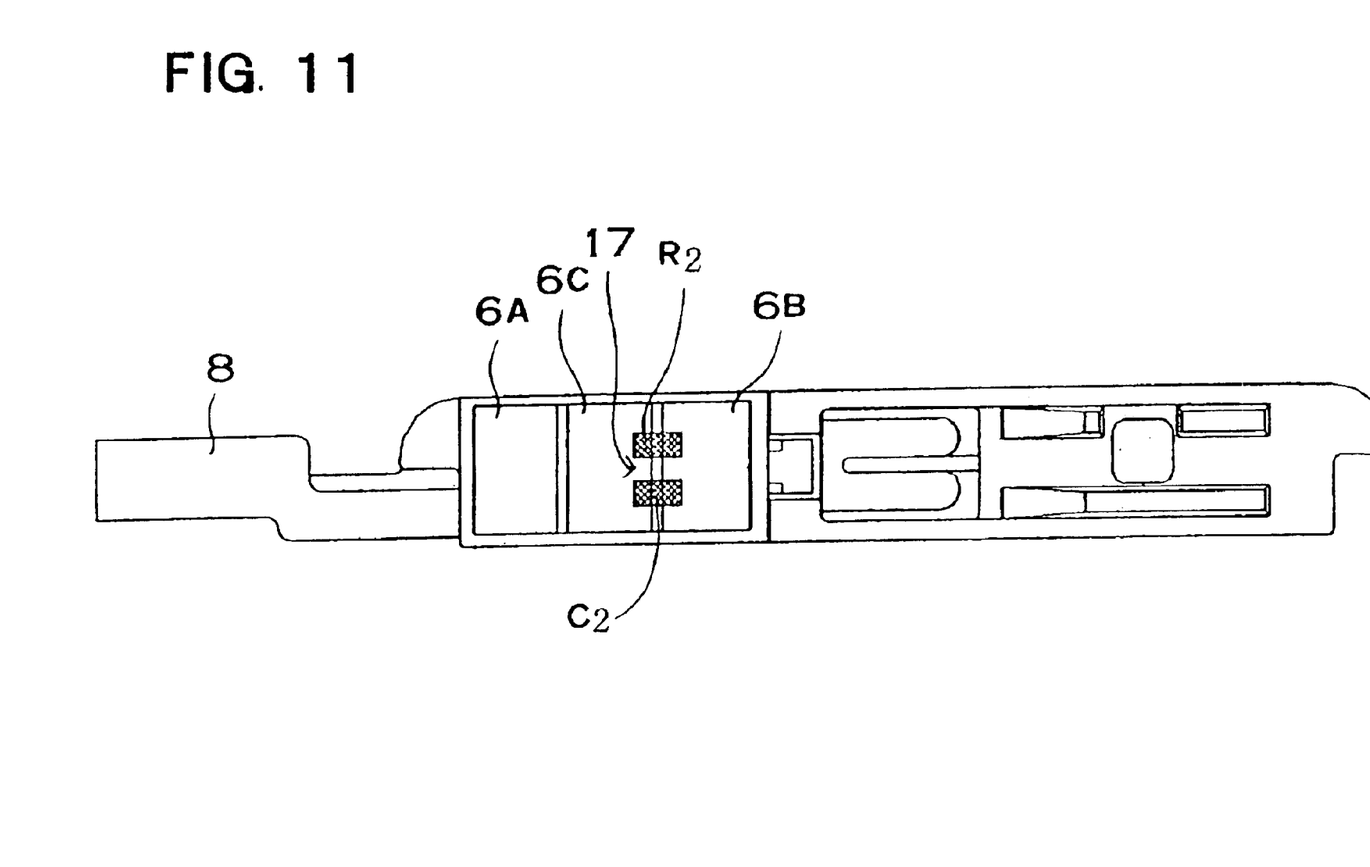
FIG. 11 is a plane view showing the terminal section for a battery pack of FIG. 9.
Figure 12:
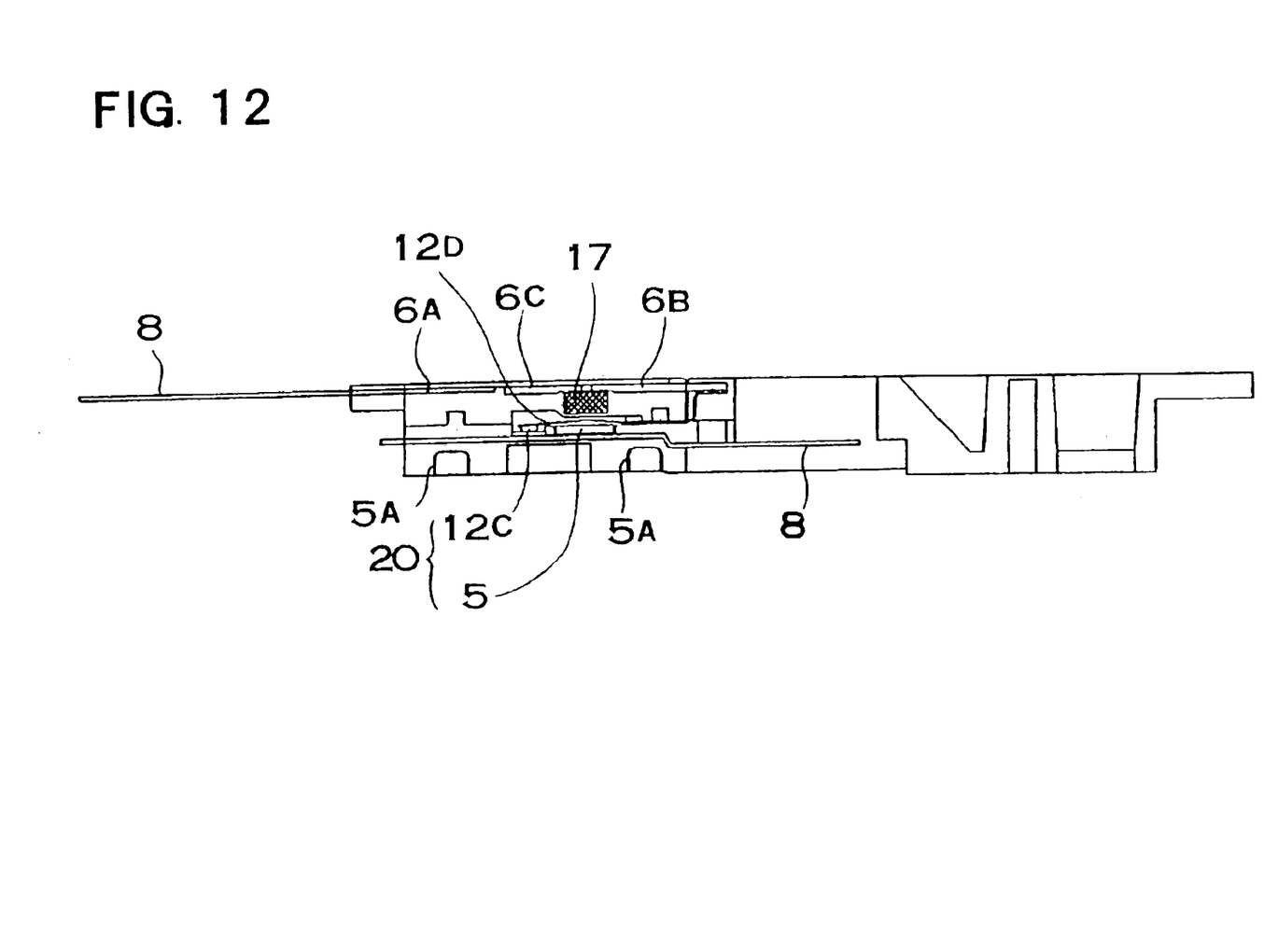
FIG. 12 is a lengthwise cross-section view showing the terminal section for a battery pack of FIG. 9.
Figure 13:
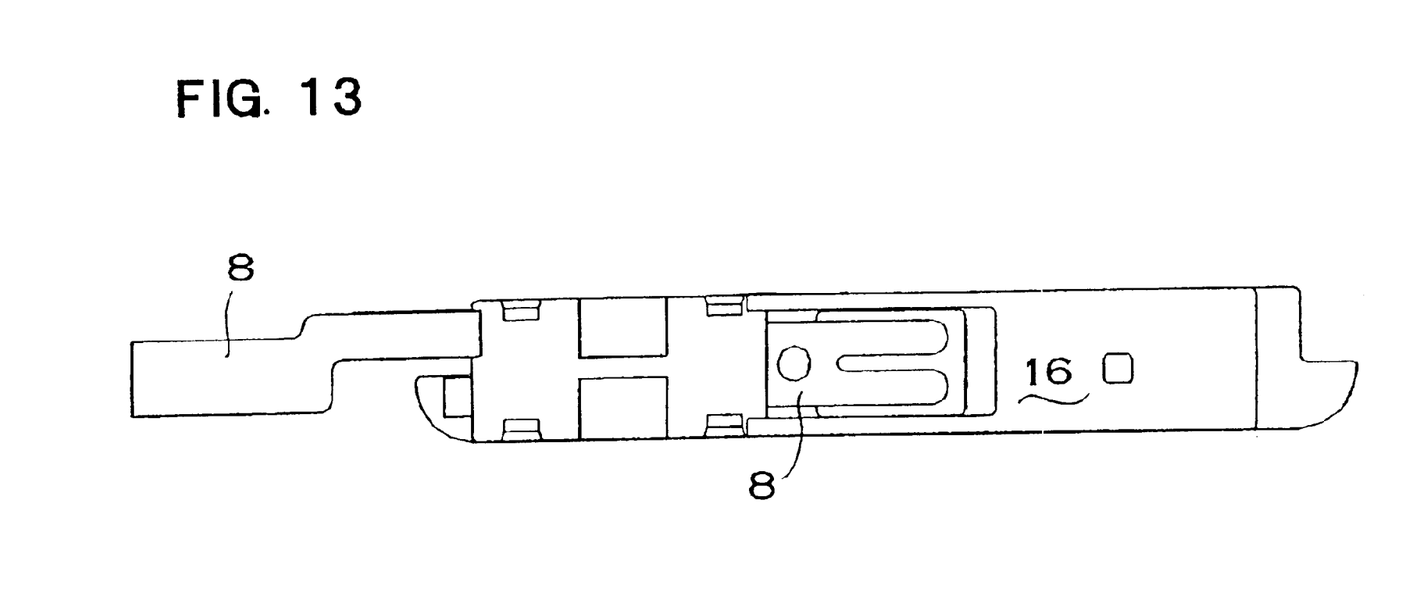
FIG. 13 is a bottom view showing the terminal section for a battery pack of FIG. 9.
Figure 14:
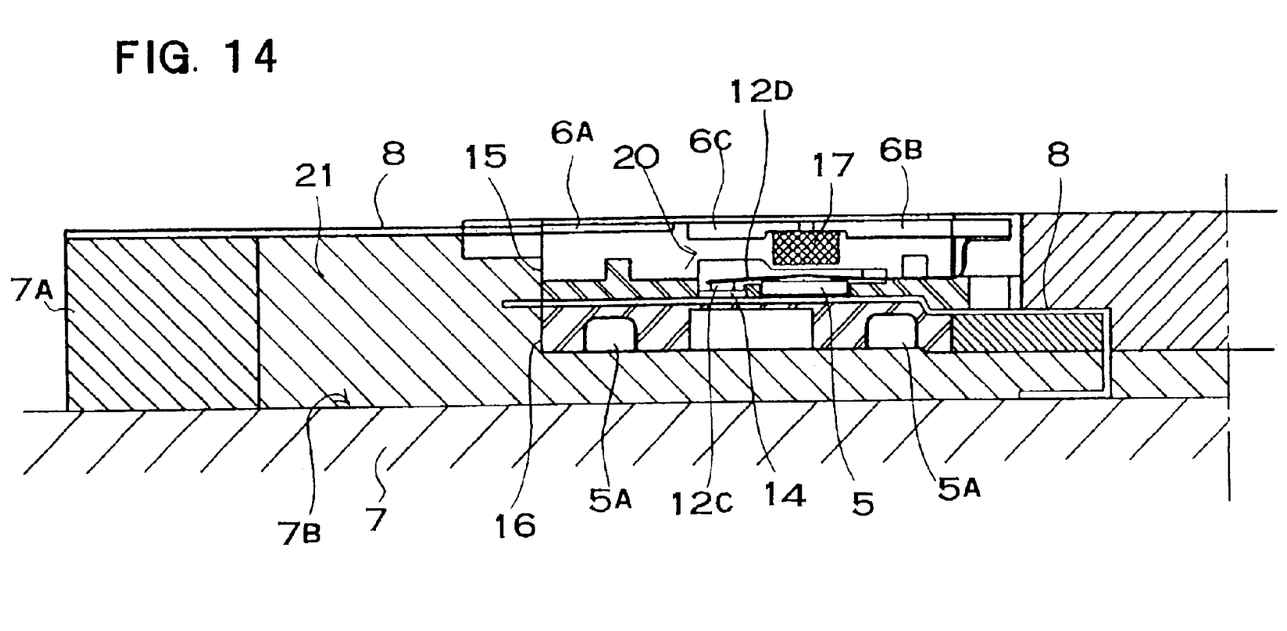
FIG. 14 is a lengthwise cross-section view showing the terminal section for a battery pack of FIG. 9 mounted on a battery.

To describe the protection device 3 in detail, an oblique view is shown in FIG. 9, an exploded oblique view is shown in FIG. 10, a plane view is shown in FIG. 11, a lengthwise cross-section view is shown in FIG. 12, a bottom view is shown in FIG. 13, and a lengthwise cross-section view showing the protection device 3 attached to a battery 7 is shown in FIG. 14. The protection device 3 shown in these figures is provided with a cover 15 for the output terminals 6, a contact switching section 12 to switch contact when abnormality occurs, a protection element 5 to limit current and protect the rechargeable battery 4 when abnormality occurs, and a protection device base 16. This protection device 3 is made by joining its cover 15 and base 16 and disposing safety elements 20, such as the contact switching section 12 and protection element 5, between the cover 15 and base 16. The cover 15 and base 16 are joined together by fastening with screws or hooks etc., or by welding or bonding etc. In addition, the cover 15 and base 16 can be joined together with synthetic resin Including the protection device 3 molded as a single unit.

The protection device 3 is electrically connected to the battery 7, which makes up the rechargeable battery 4. In the battery pack, part or all of the rechargeable battery 4 is inserted and fixed in the molded resin region 21, and the protection device 3 is inserted and fixed in the molded resin region 21 with the output terminals 6 exposed externally. The protection device 3 is configured with insulating casing, and part or all of the cover 15 and base 16 are made of insulating material. Battery pack output terminals 6 are attached to the surface of the protection device 3 cover 15, and the output terminals 6 are inserted and fixed in the molded resin region 21 via the protection device 3.

The first output terminal 6A, the second output terminal 6B, and the third output terminal 6C, which make up the output terminals 6, are disposed adjacent to each other approximately in the same plane with approximately the same shape in an externally exposed fashion on the cover 15. The cover is made of synthetic resin which forms a single piece with the output terminals. The protection device 3 can also be molded with synthetic resin as a single piece with the cover 15 and base 16. In this manner, the protection device 3 is formed as a single unit containing protection elements in insulating casing and exposing battery pack output terminals at the surface.

The protection element 5, which protects the rechargeable battery 4 from abnormal conditions, is disposed in an open region at the mating surface of the cover 15 and base 16. The protection element 5 is connected between the rechargeable battery 4 and the output terminals 6 and shuts down rechargeable battery 4 output when abnormality occurs to prevent over-current. The protection element 5 can be housed in the protection device 3 to directly connect it with the output terminals 6 or dispose it in a position close to the output terminals 6. Consequently, a separate protection circuit is not necessary, a circuit board and electronic components are not required, and additional space inside the battery pack does not need to be allocated to house those parts thereby contributing to size and cost reduction.

Further, the protection device 3 has a detection device 17, which identifies the type of the rechargeable battery, directly attached to the surface of the output terminals 6. Specifically, while the front surfaces of the output terminals 6 are exposed externally as connection terminals for the electrical equipment, the backsides of the output terminals 6 are used for detection device 17 attachment, and the detection device 17 is directly fixed to the output terminals 6 by soldering or spot welding etc. By using both sides of the output terminals 6 in this manner, protection device 3 space is efficiently used to allow a compact structure. Furthermore, wiring between the detection device 17 and the output terminals 6 is minimized, and omitting wiring and circuit boards contributes to cost and space reduction. Detailed description of each component follows.

Output Terminals

As shown in FIG. 3, the cover 15 of the protection device 3 has output terminals 6 attached to its surface. The output terminals 6 are exposed outside the external case 1, and connect with power supply terminals (not illustrated) on the electrical equipment. The output terminals 6 are provided with a first output terminal 6A and second output terminal 6B which connect with positive and negative power supply terminals, and with a third output terminal 6C which Is a signal terminal. These output terminals 6 are each exposed externally as rectangular shapes of approximately the same size, they are disposed next to each other in the cover 15, and they are formed as a single piece with the synthetic resin cover 15. In FIGS. 9 and 10, the output terminals 6 are disposed in approximately a straight line and in order from left to right, the first output terminal 6A, the third output terminal 6C, and the second output terminal 6B, but it should be clear there is no limit to the above arrangement.

Signal Terminal

Figure 15:
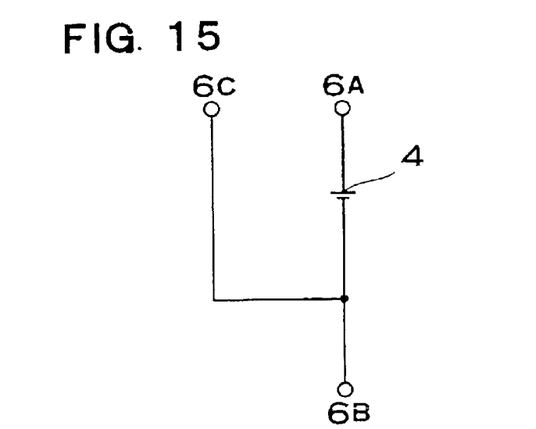
FIG. 15 is a circuit diagram showing an output terminal wiring layout for a related technology battery pack.
Figure 16:
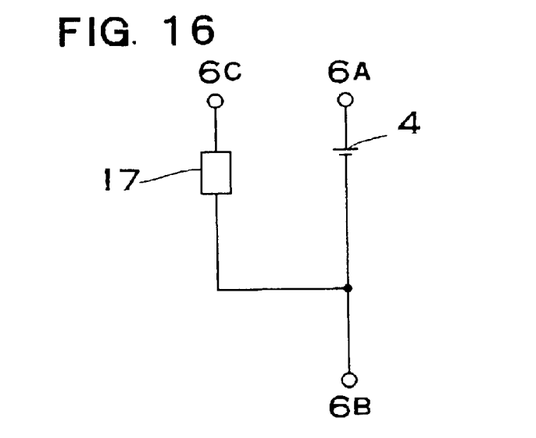
FIG. 16 is a circuit diagram showing an output terminal wiring layout for a battery pack associated with a form of embodiment of the present invention.

The third output terminal 6C, which is the signal terminal, functions as an identification terminal to distinguish the type of the battery pack. Output terminals 6 of a related technology battery pack are provided with first and second output terminals 6 which connect with rechargeable battery positive and negative power supply terminals. A related technology battery pack which is provided with a terminal for signal detection has, for example as shown in FIG. 15, the signal terminal short circuited to the negative output terminal. On the contrary, in a form of embodiment of the present invention, the detection device 17 is connected to the signal terminal as shown in FIG. 16.

Detection Device

The detection device 17 is specified corresponding to the characteristics and type of the battery pack rechargeable battery 4. For example, by specifying the detection device 17 as a resistor having resistance related to rechargeable battery 4 capacity, electrical equipment connected with the battery pack can distinguish the battery capacity of the battery pack. Since the electrical equipment can determine whether or not a suitable battery pack has been attached, the user can confirm if a suitable battery pack has been selected and attached even when a plurality of battery pack types are available. If a battery pack is determined to be of a different type, for example if a battery pack with a specified voltage not matching the electrical equipment is attached, error information can be displayed and power from the battery pack not accepted, or the user can be notified that the wrong battery pack has been attached via the display section 19 etc.

Further, if the electrical equipment is a battery charger for charging the battery pack, battery capacity can be determined by resistance detection via the third output terminal 6C, and the battery pack can be charged in an optimal fashion. Specifically, for constant current charging at 760 mA, detection device 17 resistance is set to 75 KΩ, and for constant current charging at 820 mA, resistance is set to 85 KΩ. In this manner, electrical equipment connected with the battery pack can acquire information concerning rechargeable battery 4 characteristics set by the detection device 17 and detected by voltage and current etc. detected at the signal terminal.

In addition, battery pack authenticity can be determined based on the detection device 17. For example, when a battery pack with equal terminal voltage but not recommended as an authentic battery pack, in other words a battery pack with no detection device 17, is connected to the electrical equipment, it is judged as not authentic by detecting the voltage at the third output terminal 6C. In that case, it is possible for the electrical equipment to judge battery pack authenticity and display an error message etc. In particular, problems such as power supply instability can result from connecting a poor quality battery pack which does not meet authentic specifications, such as a pirate battery pack, these problems can be avoided by distinguishing battery authenticity with certainty, and battery pack reliability can be improved.

Figure 17:
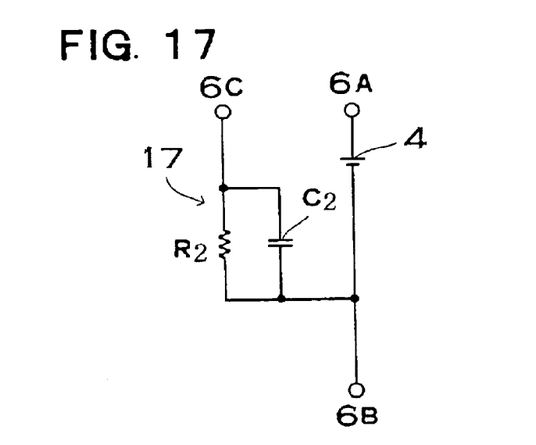
FIG. 17 is a circuit diagram showing an output terminal wiring layout for a battery pack associated with a form of embodiment of the present invention.

The detection device 17 can be a resistor or capacitor, and a chip resistor or IC chip can be used. For example in FIG. 17, a resistor R2 and capacitor C2 are connected in parallel between the second output terminal 6B and the third output terminal 6C. As shown in FIG. 10, these components are fixed on the backside of the terminals bridging between the terminals in a conducting fashion. Consequently, battery identification is possible with minimum distance connection using no wires thereby reducing component count, conserving space, and lowering cost.

If an IC chip etc. is used as the detection device 17, data communication between the battery pack and the electrical equipment can take place via the signal terminal, and more sophisticated battery pack identification is possible.

The third output terminal 6C, which is the signal terminal, can also function as an abnormality detection terminal to detect rechargeable battery 4 abnormalities, in addition to having the function of battery pack type identification. The electrical equipment can be notified of an abnormal occurrence by establishing a change in voltage or current at the signal terminal when an abnormality is detected. By using the signal terminal to both identify battery type and detect abnormalities, terminal and part count is reduced to allow simplified assembly and reduced size and cost.

Contact Switching Section

The contact switching section 12 shown in FIG. 10 is a circuit breaker. The circuit breaker is configured with safety elements 20 disposed between the cover 15 and the base 16, and is provided with a movable contact plate 12D. The movable contact plate 12D is a conducting metal plate which can flexibly deform, it has one end fixed at the second output terminal 6B and the third output terminal 6C, and it has contact metal 12C fixed at its front end. The movable contact plate 12D is in the ON state when the contact metal 12C is touching a fixed contact 14 on a lead 8 attached to the base 16, and can switch to the OFF state when it separates from the lead 8. The movable contact plate 12D is made of temperature distorting metal to deform with temperature by itself, or it can turn ON and OFF with temperature change via a separate temperature distorting metal material. The temperature distorting metal is bimetal or tri-metal, which are laminates of metals with different thermal coefficients of expansion. The temperature distorting metal deforms with temperature rise and the movable contact plate 12D switches from the ON position to the OFF position.

The temperature distorting metal of the circuit breaker detects battery temperature and switches the movable contact plate 12D ON and OFF. However, although not illustrated, the circuit breaker can also be configured to carry battery current in the temperature distorting metal, or a heat dependent resistor can be connected in series with the battery, the heat dependent resistor can be configured to heat the temperature distorting metal, and the circuit breaker can detect over-current and cut-off current flow. The movable contact plate can also be temperature distorting metal. Since the movable contact plate is also used as temperature distorting metal in this type of circuit breaker, the internal structure can be simplified.

Although a circuit breaker is used in the contact switching section 12 of FIG. 10, a PTC device, fuse, or protection circuit configured from an electronic circuit can also be used as a protection element 5, or used in combination in the contact switching section 12.

Protection Element

The protection device 3 is provided with a protection element 5 which shuts down current to safely protect the battery when a battery abnormality occurs. Besides a PTC device, a fuse or protection circuit configured from an electronic circuit can be used as the protection element 5. In the case of PTC device use, material is housed in the base 16 which has electrical resistance that increases radically when temperature exceeds a set temperature and effectively shuts down current flow. A fuse detects over-current and cuts-off current flow. In the case of fuse use, a protection element which melts open with excessive current is housed in the base 16. A protection circuit which is an electronic circuit detects over-current, temperature, over-charge, or over-discharge and controls charging and discharging current. A protection circuit configured from an electronic circuit is implemented by housing necessary electronic components in the base 16. Otherwise, a circuit breaker which detects temperature or over-current and cuts-off current flow can also be used in place of the protection element 5. Since the contact switching section 12, such as a circuit breaker, described above can also detect temperature or current increase, the contact switching section 12 and protection element 5 can be combined to detect abnormalities and protect the battery and circuitry. In the example of FIGS. 1 and 2, a protection element 5 which detects temperature rise and a contact switching section 12 were combined to change connections with the contact switching section 12 when an abnormality occurred and also to limit current flow with a high temperature, high current protection device. Therefore, activation temperature for the bimetal and PTC device are made approximately the same.

The protection device 3 shown in FIG. 14 has output terminals 6 fixed to the surface of the cover 15, and the protection device 3 serves additionally as a terminal holder to fix the output terminals 6 in specified positions. The first output terminal 6A is connected to the battery 7, the third output terminal 6C is connected to the second output terminal 6B via the detection device 17, and the second output terminal 6B is connected to the battery 7 via a safety element 20 disposed on the base 16. The output terminals 6 are inserted and fixed in the plastic cover 15. However, the output terminals 6 can also be attached to the cover 15 by means such as pins, screws, or pressure fitting etc.

The protection device 3 Is also provided with alignment cavities 5A to temporarily hold the battery pack core in proper alignment inside the mold when forming the molded resin region 21. The base 16 of the figures is provided with a plurality of alignment cavities 5A in both sides of its bottom surface. The alignment cavities 5A are recessions provided in the bottom surface of the base 16. Pins in the mold insert in the alignment cavities 5A to temporarily hold the protection device 3 in proper position within the mold.

In the protection device 3 shown in FIG. 14, a pair of leads 8 to connect to the battery 7 are attached to the cover 15 and base 16. The pair of leads connects to the positive and negative electrodes of the battery 7 to connect the protection device 3 with the battery 7. The leads 8 extend outside the cover 15. One lead 8 is connected as a unit with the metal plate which forms the first output terminal 6A. The other lead 8 connects with the second output terminal 6B via the safety element 20 disposed on the base 16. The leads fix to the protruding electrode 7A and planar electrode 7B of the battery 7 to connect the phosphors 3 with the battery 7. The leads are welded and fixed on the battery 7 electrodes by a method such as resistive welding or laser welding etc. By connecting the protection device 3 to the battery 7 via the pair of leads 8, the battery pack core is assembled. A battery pack with the protection device 3, which has output terminals 6 attached, connected to the battery 7, can connect the protection device 3, output terminals 6, and the battery 7 without using a circuit board. Consequently, in the battery pack of FIG. 14, the protection device 3 is inserted and fixed in the molded resin region 21, which is the external case 1, without a circuit board. However, in a battery pack of the present invention, the protection element can also be attached to a circuit board and connected to the battery via the circuit board. In addition, the output terminals can also be attached to a terminal holder and fixed to a specified position in the external case.

Since the type of the rechargeable battery housed in a battery pack described above can be distinguished, electrical equipment can accurately distinguish between a plurality of types of battery packs, a warning can be issued for attachment of a battery pack different from requirements, battery packs not meeting specifications can be excluded, charging can be performed that is most suitable for the battery pack, and the battery pack can be used in an optimal fashion. For example, there is no need to change battery pack shape to a special shape to fit connected electrical equipment, connection of a different type of battery pack with a shape that fits with the electrical equipment by coincidence can be avoided, and mistaken connection of battery packs can be effectively avoided. In particular, a configuration that directly attaches the detection device, which distinguishes battery type, to the backside of the exposed surfaces of the output terminals allows maximum circuit simplification, makes wires unnecessary to minimize the number of parts, and contributes to size and cost reduction. Finally, in the case where abnormal current protection is incorporated in the battery pack terminal region, the signal terminal is used not only for rechargeable battery identification, but also for detection of battery abnormalities resulting in reduction in the number of terminals and contributing to battery pack size reduction.

As this invention may be embodied in several forms without departing from the spirit of essential characteristics thereof, the present embodiment is therefore illustrative and not restrictive, since the scope of the Invention is defined by the appended claims rather than by the description preceding them, and all changes that fall within the metes and bounds of the claims or equivalence of such meets and bounds thereof are therefore intended to be embraced by the claims.

This application is based on Japanese patent application no. 2003-81065 filed on mar. 24, 2003, Japanese patent application no. 2003-120660 filed on Apr. 24, 2003, and the contents of which are incorporated here into by reference.

What is claimed is:

1. A battery pack comprising:
   a rechargeable battery having a first electrode and a second electrode; and
   a protection device to protect the rechargeable battery when a rechargeable battery abnormality is detected,
   wherein the protection device has output terminals including:
      an externally exposed first output terminal connected to the first electrode of the rechargeable battery,
      an externally exposed second output terminal connected to the second electrode of the rechargeable battery,
      an externally exposed third output terminal for signal detection, and a contact switching section allowing contact to be switched to protect the rechargeable battery when a rechargeable battery abnormality is detected, and wherein the protection device is the output terminals and contact switching section formed as a single piece, wherein the contact switching section has a first end connected to the second output terminal, and a second end which is connected to allow switching between a contact connected to the second elcetrode of the rechargeable battery and a contact connected to the third output terminal, wherein when no abnormality is detected the other end is connected to the contact connected to the second electrode of the rechargeable battery, and wherein when an abnormality is detected, the other end switches to the contact connected to the third output terminal.

2. A battery pack as recited in claim 1 wherein the third output terminal is connected to a detection device to distinguish the type of the rechargeable battery.

3. A battery pack as recited in claim 1 wherein the third output terminal is connected to a detection device to discern rechargeable battery temperature rise.

4. A battery pack as recited in claim 2 wherein the detection device is connected between the third output terminal and the second output terminal.

5. A battery pack as recited in claim 1 wherein a protection element, connected between the second electrode of the rechargeable battery and the second output terminal, is provided as a safety element, housed in the protection device, to protect the rechargeable battery when a rechargeable battery abnormality is detected.

6. A battery pack as recited in claim 5 wherein the protection element is a PTC device.

7. A battery pack as recited in claim 4 wherein a protection element, connected between the second electrode of the rechargeable battery and the second output terminal, is provided as a safety element, housed in the protection device, to protect the rechargeable battery when a rechargeable battery abnormality is detected.

8. A battery pack as recited in claim 7 wherein the protection element is a PTC device.

9. A battery pack as recited in claim 7 wherein the safety element and detection device of the protection device are connected at the surface opposite the externally exposed surface of the output terminals.

10. A battery pack as recited in claim 9 wherein the detection device is electrically connected between the second output terminal and the third output terminal by direct attachment to the backside of the exposed output terminal surfaces.

11. A battery pack as recited in claim 1 wherein the rechargeable battery and the protection device are molded in synthetic resin to form a single piece.

12. A battery pack as recited in claim 1 wherein the contact switching section is provided by an arm which is activated by bimetal.

13. A battery pack as recited in claim 12 wherein one end of the arm is a fixed end, the other end is a switching end, in its normal position the switching end connects to a contact connected to the second output terminal connecting the arm in parallel with the protection element, the switching end can switch to an abnormal position connected to a contact connected to the third output terminal connecting the third output terminal with the second electrode of the rechargeable battery, when an abnormality due to temperature rise is detected by the bimetal activated arm, it switches from the normal position to the abnormal position, and when the arm ceases to detect an abnormality, it returns to the normal position.

14. A method of detecting battery pack abnormalities, wherein the battery pack is provided with a rechargeable battery that can be charged and a protection device to protect the rechargeable battery when an abnormality is detected, comprising:

A step, when the protection device detects no rechargeable battery abnormality, for the electrical equipment connected with the battery pack to detect a detection device signal from the third output terminal connected to the detection device, which distinguishes the type of the rechargeable battery;

A step, when the protection device detects a rechargeable battery abnormality, to bypass the detection device and connect the second electrode of the rechargeable battery to the third output terminal; and A step for the electrical equipment to detect abnormality via the third output terminal, and transition to a specified abnormal mode of operation, which can operate at a lower voltage than the specified voltage of the rechargeable battery.

15. A method of detecting battery pack abnormalities as recited in claim 14 wherein the specified abnormal mode of operation is display of a specified display screen.

* * * * *